April 30, 1940.  P. M. SCHUFTAN  2,198,743
PROCESS FOR PURIFYING GASES
Filed Jan. 4, 1938
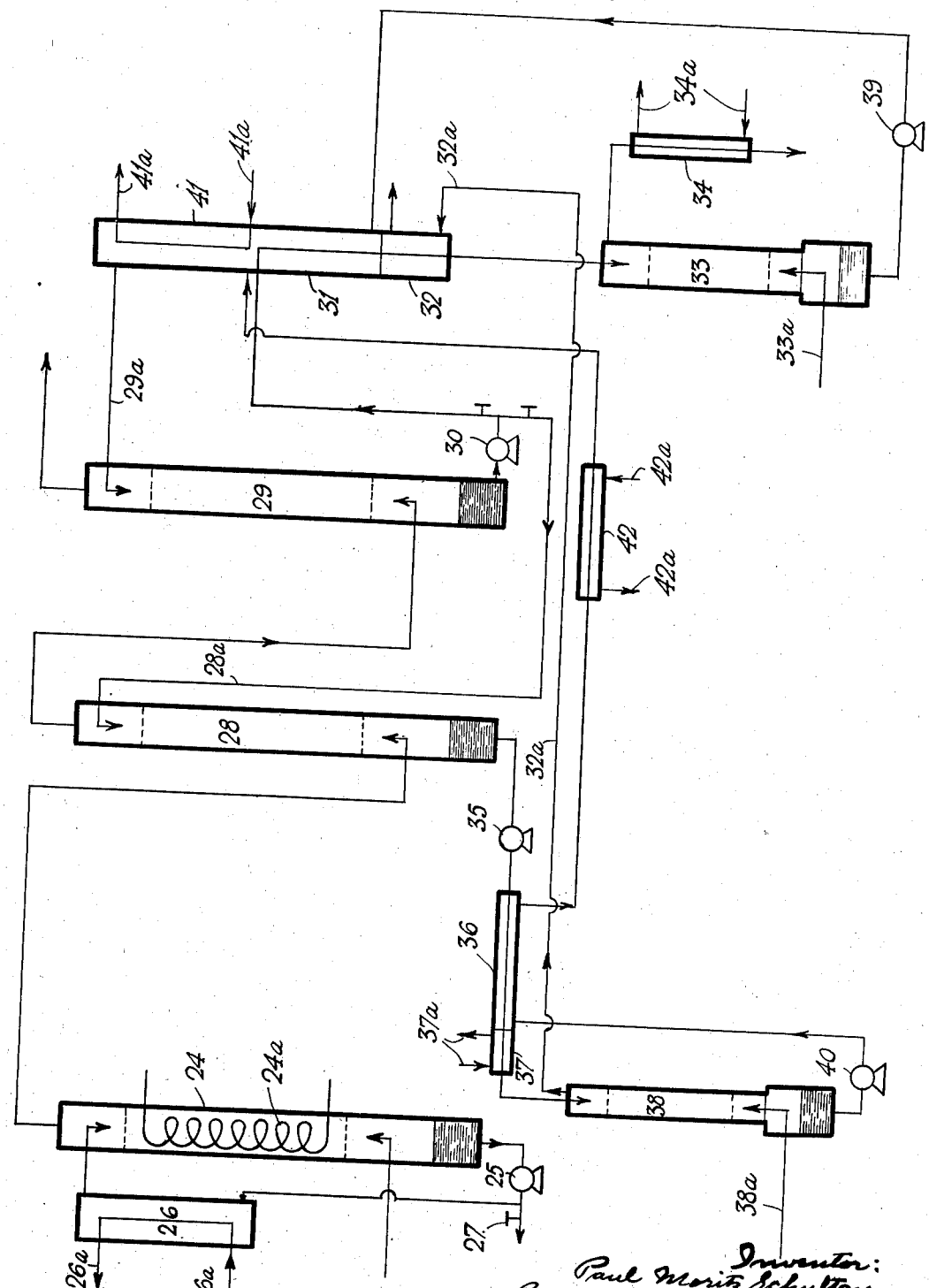

Patented Apr. 30, 1940

2,198,743

UNITED STATES PATENT OFFICE 2,198,743

PROCESS FOR PURIFYING GASES

Paul Moritz Schuftan, Church Road, Richmond Hill, England

Application January 4, 1938, Serial No. 183,378
In Great Britain January 18, 1937

5 Claims. (Cl. 183—115)

This invention relates to a method of purifying industrial combustible gases such as gases obtained by the distillation of carbonaceous materials, for example illuminating or coke oven gas and also other gases such as water gas or gas mixtures used in chemical syntheses and aims at substantially removing from such gases impurities such as gum, naphthalene, water, liquid hydrocarbons and organic sulphur compounds such as carbon disulphide, thiophenes and the like.

One object of the invention is to free industrial combustible gases as completely as possible from deleterious impurities and further objects are to ensure the selective recovery of the various gas constituents by the use of the smallest possible amount of washing medium, and to obtain the gas constituents in a high degree of purity and concentration by carrying out the washing in several stages.

A still further object of the invention is to ensure a substantial economy in the use of steam and cooling water by separate stripping of the rich spent solvents.

With the above more important objects in view, the invention consists in the method now to be described, and specified more particularly in the claims appended at the end of the description.

The preferred method of purifying industrial combustible gases, such as those above mentioned consists in washing and cooling said gases in three stages at nearly atmospheric pressure with a wash oil of relatively low molecular weight cooled down to near 0° C., but not below and separately stripping the solvents from the second and third stages under optimum physical and chemical conditions.

This involves washing and cooling the gas in the subsequent stages with the minimum amount of a suitable cold washing medium of sufficient cold content to cool the gas down to nearly the inlet temperature of the solvent entering the washer; the solvent must further have a sufficient absorption capacity to remove a certain constituent or a group of such constituents from the gas. The same washing medium will be used in all stages, the necessary amount being passed without stripping from a later stage to an earlier one.

The stripping of the spent solvents from the second and third stages is performed in separate stills.

The invention may be performed in the following way:

In the first stage the constituents of the lowest volatility such as gums and naphthalene are removed, thus avoiding pollution and thickening of the bulk of solvents used in the subsequent stages and resulting in a reduction of the consumption of fresh solvent. In this first stage water vapour is condensed out from the gas by the cooling, whereby traces of ammonia and hydrogen cyanide which may still be contained in the gas, are removed. The oil leaves the washer at a substantially higher temperature with the condensed water and containing the whole of the naphthalene in solution. The oil will be re-circulated, only a small amount being withdrawn so as to eliminate the quantity of naphthalene being continuously removed from the gas. This amount of oil need not be stripped as it contains also the whole of the gum and its quantity roughly corresponds to the amount which has to be normally withdrawn from wash oil plants for avoiding too much thickening. As make-up for the first stage, oil from the second stage may be used.

In a second stage the removal of hydrocarbon vapours such as benzole, gasoline, etc., hereinafter called benzole, takes place, the washer being supplied with the minimum amount of cold solvent to ensure the benzole removal so that the bulk of organic sulphur compounds remains in the gas. By such a selective benzole removal the total amount of solvent needed for the removal of organic sulphur becomes lower; indeed, the considerable heat of condensation of the benzole is taken away in the second stage and the third stage thus operates at a constant low temperature. On the other hand, in this way, the spent solvent of the third stage remains practically free from benzole and contains only constituents of high volatility which can be expelled at a lower temperature and/or with less steam than if benzole were present. This permits the use of waste steam and avoids the danger of thickening of the solvent.

A further result of the selective benzole removal is the low sulphur content of the benzole, while with a joint removal of benzole and organic sulphur in one stage the benzole would, of course, include the totality of the organic sulphur contained in the gas, causing considerable extra costs for producing a standard product from this raw material.

The wash oil used in the process will be selected especially in regard to a high absorption power for organic sulphur. In virtue of the low working temperature, solvents of relatively low molecular weight can be used without the danger of any substantial evaporation loss, so that the absorption power of the solvent is increased twofold, i. e., by the reduction of the temperature and of the molecular weight. The amount necessary for feeding the second stage is taken directly from the spent oil of the third stage without stripping the same. As this oil is already saturated with organic sulphur, no further removal can take place in the second stage. Furthermore, less oil has to be stripped from the third stage.

The washers can be of known type, either tower washers, mechanical washers or static washers being suitable.

The cold of the spent solvents can be utilised subject to practical limits as completely as possible for pre-cooling the stripped solvents in interchangers. Cold losses due to temperature differences of the interchangers, the heat of condensation of the removed gas constituents and the heat influx from outside can be compensated for in final solvent coolers arranged before the inlet into the washers.

The coldness of the purified gas may be transferred by direct or indirect interchange to the incoming crude gas, using continuous interchangers or a pair of regenerators, used alternately. In the latter case the condensed water vapour is re-vaporised resulting in a considerable economy in the amount of cold to be produced, but, of course, in this case the cold of the purified gas may also be transferred to the cooling medium which is thus pre-cooled.

The stripping of the spent solvents is performed in a known manner; preheating the solvents by heat exchange with the stripped oil, finally heating up to the stripping temperature by steam and expelling the dissolved constituents in a still by direct steam. However, by the use of separate stripping units for each washing stage according to the invention a considerable saving of steam and cooling water is possible, as the vapours escaping from the still of a foregoing stage can be used for the final heating up of the solvent before entering the still of the next stage operating at a lower temperature.

Conversely the vapours escaping from the last stage may be recompressed and used in the still of the foregoing stage for expelling the dissolved hydrocarbons.

When only partially stripping the oil from the second stage either by using less steam or when by-passing a part of the oil, a partial benzole extraction within any desired limits can be obtained. In this case the solvent of the last stage will contain considerable quantities of benzole resulting in an increase of its absorption power for organic sulphur compounds. Thus the quantity of steam used in the still of the last stage will have to be reduced to such an extent as to expel only organic sulphur but no benzole.

A representative example of plant embodying the invention is illustrated diagrammatically in the accompanying drawing. 10,000 cubic metres of illuminating gas, previously freed in known manner from tar, ammonia and hydrogen sulphide, but saturated with naphthalene and water vapour and containing the usual amount of gum, benzole and organic sulphur compounds are boosted up to a slight pressure, sufficient to compensate for the pressure drop in the plant, and introduced into a washer 24 supplied with 16 cubic metres of wash oil cooled down to 5° C. By additionally cooling with a refrigerant in coil 24a an amount of heat is removed, roughly corresponding to the heat of condensation of the water.

In this washing stage gum, naphthalene and water are substantially removed from the gas which leaves the washer at a temperature of 5° C. The spent oil collects at the bottom of the washer at a temperature of about 12° C. containing the naphthalene removed from the gas in a concentration of about 12% by weight. The wash oil is re-circulated by pump 25 back to the washer after having been again cooled down to 5° C. in an ammonia cooler 26 supplied with ammonia through pipes 26a. Through valve 27 about 65 kilograms of wash oil are continuously withdrawn from the cycle, containing the amount of gum and naphthalene removed from the gas and a corresponding amount of spent oil is taken from the second stage and used as make-up.

The gas, cooled to nearly 0° C. is then introduced into the second stage washer 28 for the removal of benzole hydrocarbons this washer being supplied through pipe 28a with 10 cubic metres of wash oil, cooled down to 5° C. The oil leaves the washer at a temperature of about 13° C., and the gas at a temperature of about 8° C.

The gas now enters the third stage washer 29, in which the removal of organic sulphur compounds takes place and which is operated at a constant temperature of about 5° C. The washer is supplied through pipe 29a with 25 cubic metres of wash oil cooled down to 5° C. The oil leaves the washer at a temperature of about 6° C., and is withdrawn by pump 30. 10 cubic metres of this spent oil are returned through the pipe 28a without stripping back to washer 28, while the remaining 15 cubic metres are heated up in interchanger 31 by returning stripped oil, and in heater 32 by additional waste steam, to the stripping temperature of 100° C. The oil is then stripped in column 33 by 400 kilograms of waste steam supplied through pipe 33a, and the escaping vapours may be cooled in the reflux condenser (not shown) at the top of the column in order to retain vaporised wash oil constituents and condensed in a subsequent water cooler 34 supplied with water through pipes 34a.

In the same way the 10 cubic metres of spent oil from the second stage are withdrawn by pump 35 and heated up in interchanger 36 and heater 37 (supplied with steam through 37a) and stripped in still 38 at a temperature of about 120° C. with about 350 kilograms of waste steam supplied through 38a. The mixture of water vapour and benzole vapour leaving the stripping column 38 is taken through pipe 32a and used for preheating in the heater 32.

The stripped oils are returned by pumps 39 and 40 into the interchangers 31 and 36 and the oils are jointly cooled down to 5° C. in the ammonia cooler 41 supplied with ammonia through pipes 41a. The oil from the second stage can, however, be additionally cooled in the cooler 42 arranged between interchanger 36 and ammonia cooler 41, the cooler 42 being supplied with cooling water through pipes 42a.

The purified gas leaving washer 29 at a temperature of about 5° C. is substantially free from gum, naphthalene, water, benzole and organic sulphur compounds. Its cold content may be used in known manner in interchangers or regenerators for pre-cooling incoming gas or the refrigerant.

Although the invention has been described as applied to the complete purification of illuminating gas, it is also appliable to the partial or complete purification of similar gases.

The working temperature has been specified to be about 5° C. in order to avoid with security any danger of ice forming in the plant. Nevertheless, the working temperature should be kept as close as possible to the freezing point of water as is compatible with safety, since any reduction in the working temperature produces a considerable saving in operating costs.

What I claim as my invention and desire to secure by Letters Patent is:

1. Process for substantially purifying industrial combustible gases at nearly atmospheric pressure by treating the gas in three stages with wash oil cooled to nearly 0° C., but not below, removing in the first stage gums, naphthalene and water by washing and cooling the gas to nearly 0° C. with oil circulated without stripping, selectively washing out benzole hydrocarbons in the second stage and organic sulphur compounds in the third stage, using in the second stage part of the spent oil leaving the third stage, stripping separately the remaining spent oil from the third stage and the spent oil leaving the second stage, cooling the two regenerated oil portions to nearly 0° C., but not below, by cold exchange and additional cold supply and re-using the mixture in the third stage.

2. Process as defined in claim 1 in which a part of the oil circulated in stage 1 is continuously withdrawn while a corresponding amount of spent oil from the second stage is used as make-up.

3. Process as defined in claim 1 in which the wash oil used in the process has a relatively low molecular weight.

4. Process as defined in claim 1 in which the heat of the vapors from the stripping of the wash oil from the second stage is used in the stripping of the oil from the third stage.

5. Process as defined in claim 1 in which the cold purified gas is returned through exchangers or regenerators in order to pre-cool the unpurified gas or the wash oil.

PAUL MORITZ SCHUFTAN.